(12) United States Patent
Sun et al.

(10) Patent No.: US 9,100,374 B2
(45) Date of Patent: Aug. 4, 2015

(54) METHOD FOR MANAGING REMOTE UPGRADING KEYS IN AN INFORMATION SECURITY APPARATUS

(75) Inventors: Jiping Sun, Beijing (CN); Yong Han, Beijing (CN)

(73) Assignee: Beijing Senselock Software Technology Co., Ltd., Beijing (CN)

( * ) Notice: Subject to any disclaimer, the term of this patent is extended or adjusted under 35 U.S.C. 154(b) by 130 days.

(21) Appl. No.: 14/111,966

(22) PCT Filed: Feb. 23, 2012

(86) PCT No.: PCT/CN2012/071545
§ 371 (c)(1),
(2), (4) Date: Oct. 15, 2013

(87) PCT Pub. No.: WO2012/146081
PCT Pub. Date: Nov. 1, 2012

(65) Prior Publication Data
US 2014/0032908 A1    Jan. 30, 2014

(30) Foreign Application Priority Data

Apr. 27, 2011    (CN) .......................... 2011 1 0106070

(51) Int. Cl.
*H04L 9/32* (2006.01)
*G06F 21/00* (2013.01)
*H04L 29/06* (2006.01)
*H04L 9/08* (2006.01)

(52) U.S. Cl.
CPC .......... *H04L 63/0428* (2013.01); *H04L 9/0891* (2013.01); *H04L 63/061* (2013.01); *H04L 63/1441* (2013.01)

(58) Field of Classification Search
None
See application file for complete search history.

(56) References Cited

U.S. PATENT DOCUMENTS 4,731,840 A * 3/1988 Mniszewski et al. ......... 380/284
4,933,971 A * 6/1990 Bestock et al. ................ 380/44
2010/0299519 A1  11/2010 Xiao et al.

FOREIGN PATENT DOCUMENTS

CN    101039524 A    9/2007
CN    101222325 A    7/2008
CN    102170355      8/2011

OTHER PUBLICATIONS

International Search Report from corresponding application PCT/CN2012/071545, dated May 31, 2012.

* cited by examiner

*Primary Examiner* — Fatoumata Traore
(74) *Attorney, Agent, or Firm* — Renner, Otto, Boisselle & Sklar, LLP

(57) ABSTRACT

The present invention discloses a method for managing remote upgrading keys in an information security apparatus. A remote source apparatus generates key disabling data according to a divulged remote upgrading key and sends the key disabling data to the information security apparatus, and the information security apparatus performs the disabling operation on the divulged remote upgrading key according to the received key disabling data. Using the method disclosed in the present invention can prevent the information security apparatus from being maliciously attacked by malicious attackers by using the divulged remote upgrading key and through the remote upgrading process.

13 Claims, 3 Drawing Sheets

METHOD FOR MANAGING REMOTE UPGRADING KEYS IN AN INFORMATION SECURITY APPARATUS

BACKGROUND OF THE INVENTION

1. Technical Field

The present invention relates to the field of information security technologies, and more particularly, to a method for managing remote upgrading keys in an information security apparatus.

2. Description of Related Art

Information security apparatuses are usually hardware security apparatuses for software encryption protection, hardware encryption protection, identity authentication and so on. Remote upgrading of an information security apparatus means that: a remote source apparatus transmits upgrading information to an upgrading interface of the information security apparatus, and the information security apparatus accomplishes upgrading of internal programs or data thereof according to the upgrading information received by the upgrading interface without the need of a professional going to the site of the information security apparatus for any upgrading operation.

The remote source apparatus may be any apparatus for storing the upgrading information such as a server, a personal computer (PC), or some other information security apparatus. The remote source apparatus may be referred to as the upgrading party, and the information security apparatus may be referred to as the upgraded party.

In the remote upgrading process of the information security apparatus, the remote source apparatus generally needs to encrypt and/or add a signature to the upgrading information, and the information security apparatus receives and then decrypts and/or performs signature verification on the encrypted and/or signed upgrading information. If the decryption succeeds and/or the signature verification passes, then it represents that the upgrading information is legal and the information security apparatus can use the upgrading information for upgrading. As can be seen, the information security apparatus necessarily has keys for decryption and/or signature verification installed therein before being issued, with the keys being called remote upgrading keys. In the prior art, a set of remote upgrading keys is generally installed and enabled in advance in the information security apparatus before the information security apparatus is issued.

However, when this set of remote upgrading keys is divulged, threats will be caused to the security of the information security apparatus. For example, when this set of remote upgrading keys is divulged, a malicious attacker may steal and acquire the legal upgrading information. If the malicious attacker alters the contents of the legal upgrading information and then sends the altered upgrading information to the information security apparatus, then he may illegally upgrade the information security apparatus and cause damage to internal programs and data of the information security apparatus, or steal the data stored in the information security apparatus by the user.

As can be seen, it is difficult to prevent the information security apparatus from being maliciously attacked due to the divulgence of the remote upgrading keys in the prior art.

BRIEF SUMMARY OF THE INVENTION

In view of this, the present invention provides a method for managing remote upgrading keys in an information security apparatus, which can prevent the information security apparatus from being maliciously attacked due to the divulgence of the remote upgrading keys.

To achieve the aforesaid objective, the technical solution of the present invention is accomplished as follows.

The present invention provides a method for managing remote upgrading keys in an information security apparatus, which comprises: installing M sets of remote upgrading keys in the information security apparatus before the information security apparatus is issued, and enabling N set(s) of the M sets of remote upgrading keys when the information security apparatus is issued, wherein M and N are positive integers larger than or equal to 1 and N is smaller than M, the method further comprising:

generating key disabling data according to a divulged remote upgrading key and sending the key disabling data to the information security apparatus by a remote source apparatus, wherein the key disabling data is used to direct the information security apparatus to perform a disabling operation on the divulged remote upgrading key; and performing the disabling operation on the divulged remote upgrading key according to the received key disabling data by the information security apparatus.

The method further comprises: setting key disabling operation identifications that are identical in the remote source apparatus and the information security apparatus before the information security apparatus is issued;

wherein the key disabling data comprises: a key disabling operation identification, a key identification of the divulged remote upgrading key, and a corresponding value of the divulged remote upgrading key; and the step of performing the disabling operation on the divulged remote upgrading key according to the received key disabling data comprises:

A1. if the key disabling operation identification in the received key disabling data is the same as the key disabling operation identification set in the information security apparatus, then a step B1 will be executed; otherwise, the process flow is ended; and B1. if the key identification of the divulged remote upgrading key in the received key disabling data is the same as a key identification of a set of remote upgrading keys that has been enabled in the information security apparatus and the corresponding value in the received key disabling data is the same as a corresponding value of the set of remote upgrading keys in the information security apparatus, then performing the disabling operation on the set of remote upgrading keys; otherwise, the process flow is ended.

The corresponding value of the divulged remote upgrading key is a key value of the divulged remote upgrading key.

The method further comprises:

performing security processing on the key disabling data and then sending the key disabling data to the information security apparatus by the remote source apparatus; and performing security check on the key disabling data that has experienced the security processing by the information security apparatus, wherein if the security check passes, then the step A1 is executed; otherwise, the process flow is ended.

The security processing comprises: encrypting and/or adding a signature to the key disabling data; and the security check comprises: decrypting and/or performing signature verification on the key disabling data that has experienced the security processing.

The method further comprises:

generating key enabling data according to a remote upgrading key to be enabled and sending the key enabling data to the information security apparatus by the remote source apparatus, wherein the key enabling data is used to direct the information security apparatus to perform an enabling operation on the remote upgrading keys that have not been enabled; and performing the enabling operation on the remote upgrading keys that have not been enabled according to the received key enabling data by the information security apparatus.

The method further comprises: setting key enabling operation identifications that are identical in the remote source apparatus and the information security apparatus before the information security apparatus is issued;

wherein the key enabling data comprises: a key enabling operation identification, a key identification of the remote upgrading key to be enabled, and a corresponding value of the remote upgrading key to be enabled; and the step of performing the disabling operation on the divulged remote upgrading key according to the received key disabling data comprises:

A2. if the key enabling operation identification in the received key enabling data is the same as the key enabling operation identification set in the information security apparatus, then the step B1 will be executed; otherwise, the process flow is ended; and B2. if the key identification of the remote upgrading key to be enabled in the received key enabling data is the same as a key identification of a set of remote upgrading keys that has not been enabled in the information security apparatus and the corresponding value in the received key enabling data is the same as a corresponding value of the set of remote upgrading keys in the information security apparatus, then performing the enabling operation on the set of remote upgrading keys; otherwise, the process flow is ended.

The corresponding value of the remote upgrading key to be enabled is a key value of the remote upgrading key to be enabled.

The method further comprises:

performing security processing on the key enabling data and then sending the key enabling data to the information security apparatus by the remote source apparatus; and performing security check on the key enabling data that has experienced the security processing by the information security apparatus, wherein if the security check passes, then the step A2 is executed; otherwise, the process flow is ended.

The security processing comprises: encrypting and/or adding a signature to the key enabling data; and the security check comprises: decrypting and/or performing signature verification on the key enabling data that has experienced the security processing.

The encrypting step comprises: performing encryption by means of the data encryption standard (DES) algorithm, the triple data encryption standard (TDES) algorithm, the advanced encryption standard (AES) algorithm, the asymmetrical encryption RSA algorithm or the elliptic curve cryptography (ECC) algorithm;

the step of adding a signature comprises: adding a signature by means of the message authentication code (MAC) algorithm, the hash message authentication code (HMAC) algorithm, the RSA algorithm or the ECC algorithm;

the decrypting step comprises: performing decryption by means of the DES algorithm, the TDES algorithm, the AES algorithm, the RSA algorithm or the ECC algorithm; and the step of performing signature verification comprises: performing signature verification by means of the MAC algorithm, the HMAC algorithm, the RSA algorithm or the ECC algorithm.

According to the technical solution of the present invention, the remote source apparatus generates the key disabling data according to the divulged remote upgrading key and sends the key disabling data to the information security apparatus, and the information security apparatus performs the disabling operation on the divulged remote upgrading key according to the received key disabling data. This can prevent the information security apparatus from being maliciously attacked by the malicious attacker by using the divulged remote upgrading key and through the remote upgrading process.

In addition, the technical solution of the present invention can not only disable the divulged remote upgrading key but can also be applied to other fields (e.g., but can also disable an overdue remote upgrading key).

Meanwhile, the present invention further enables a new remote upgrading key to replace the disabled remote upgrading key, and this makes the remote upgrading function of the information security apparatus continuously available and effectively enhances the security of the remote upgrading keys of the information security apparatus.

DETAILED DESCRIPTION OF THE INVENTION

Figure 1:
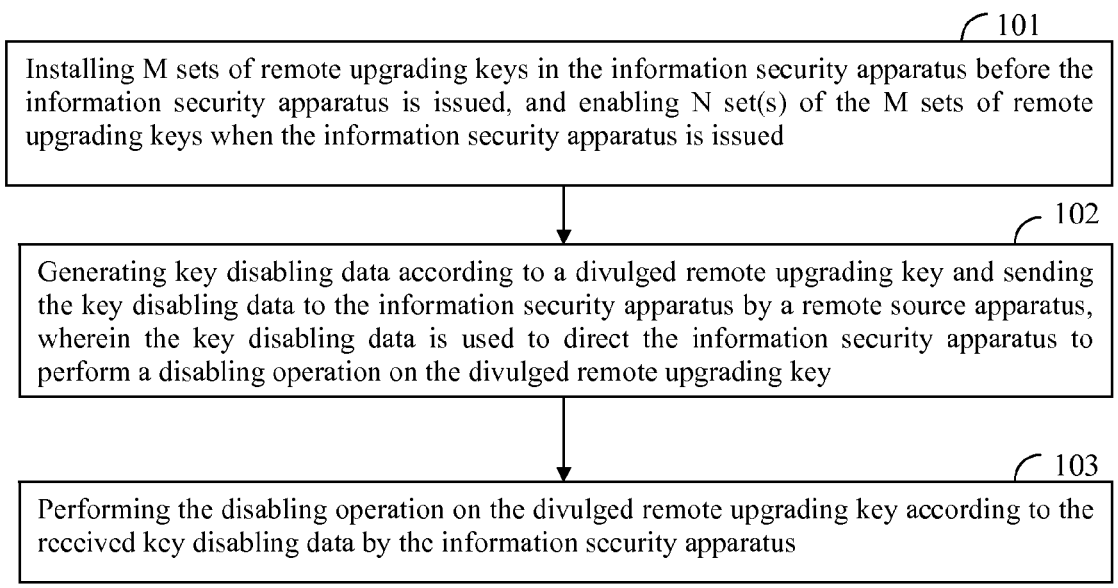
FIG. 1 is a flowchart diagram of a method for managing remote upgrading keys in an information security apparatus according to the present invention.

To make the objectives, technical solutions and advantages of the present invention clearer, the solutions of the present invention will be further detailed hereinbelow with reference to the attached drawings and embodiments thereof FIG. 1 is a flowchart diagram of a method for managing remote upgrading keys in an information security apparatus according to the present invention. As shown in FIG. 1, the method comprises the following steps.

Step 101: installing M sets of remote upgrading keys in the information security apparatus before the information security apparatus is issued, and enabling N set(s) of the M sets of remote upgrading keys when the information security apparatus is issued, wherein M and N are positive integers larger than or equal to 1 and N is smaller than M.

Step 102: generating key disabling data according to a divulged remote upgrading key and sending the key disabling data to the information security apparatus by a remote source apparatus, wherein the key disabling data is used to direct the information security apparatus to perform a disabling operation on the divulged remote upgrading key.

In addition, the step 102 may further comprise: generating key enabling data according to a remote upgrading key to be enabled and sending the key enabling data to the information security apparatus by the remote source apparatus, wherein the key enabling data is used to direct the information security apparatus to perform an enabling operation on the remote upgrading keys that have not been enabled.

Optionally, the remote source apparatus performs security processing on the key enabling data or the key disabling data before sending the key enabling data or the key disabling data to the information security apparatus.

Step 103: performing the disabling operation on the divulged remote upgrading key according to the received key disabling data by the information security apparatus.

In addition, the step 103 may further comprise: performing the enabling operation on the remote upgrading keys that have not been enabled according to the received key enabling data by the information security apparatus.

Optionally, if the remote source apparatus performs the security processing on the key enabling data or the key disabling data, then the information security apparatus further needs to perform security check on the key enabling data or the key disabling data that has experienced the security processing. If the security check passes, then legality verification is performed, and only after the legality verification passes, can the key enabling operation or the key disabling operation be executed; otherwise, the process flow is ended.

Up to this point, this process flow is ended.

Hereinbelow, the technical solution of the present invention will be further detailed with reference to two embodiments.

Embodiment I

Figure 2:
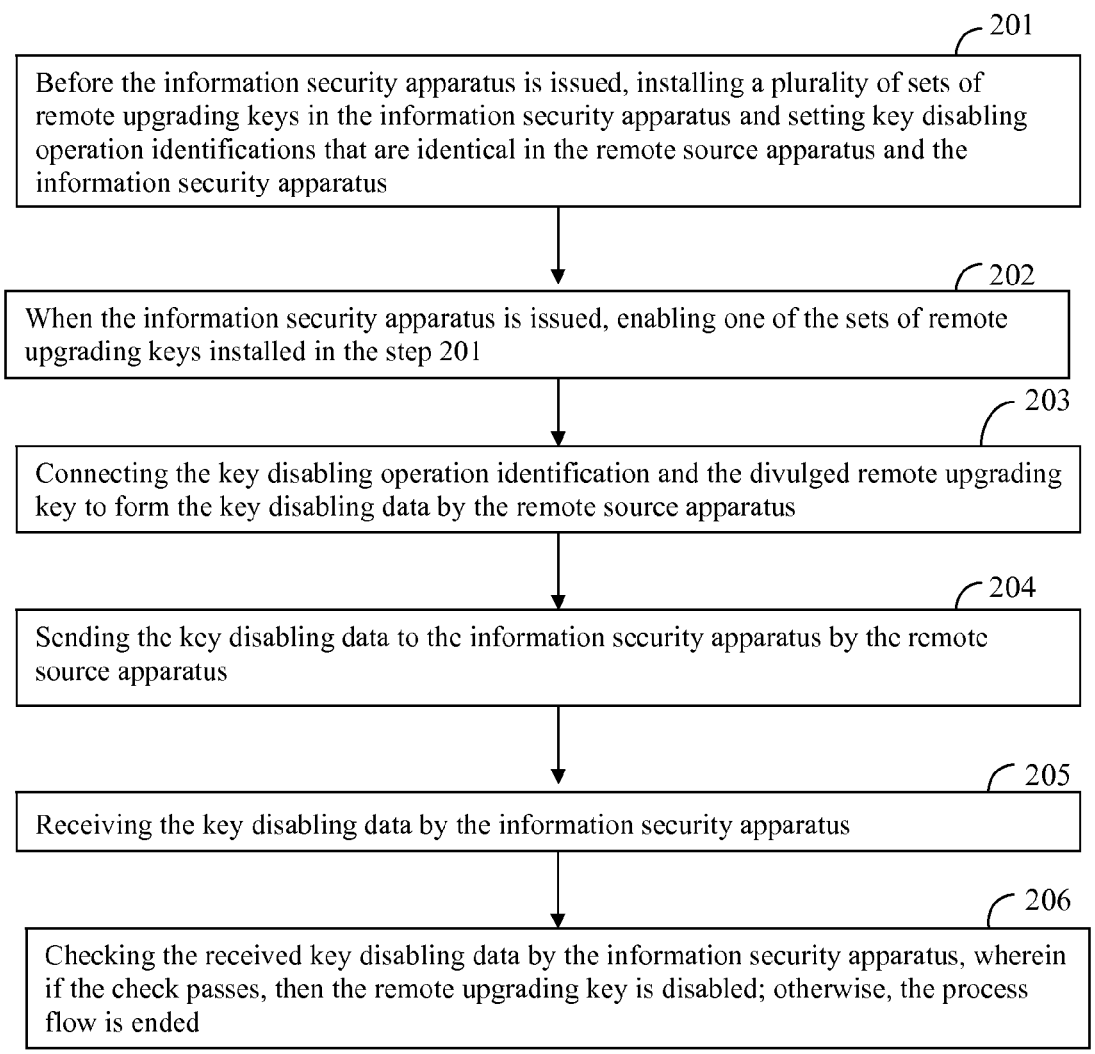
FIG. 2 is a flowchart diagram of an embodiment I of a method for managing remote upgrading keys in an information security apparatus according to the present invention.

FIG. 2 is a flowchart diagram of an embodiment I of a method for managing remote upgrading keys in an information security apparatus according to the present invention. As shown in FIG. 2, the method comprises the following steps.

Step 201: before the information security apparatus is issued, installing a plurality of sets of remote upgrading keys in the information security apparatus and setting key disabling operation identifications that are identical in the remote source apparatus and the information security apparatus.

In this step, each set of remote upgrading keys may comprise a key identification and a key value.

The key disabling operation identification is used to represent that the operation type is the key disabling operation. In this embodiment, the key disabling operation identification may be 01.

The term "disabling" described in this step means that the set of remote upgrading keys are made be noneffective keys (i.e., are not used to decrypt and/or perform signature verification on the upgrading information).

Step 202: when the information security apparatus is issued, enabling one of the sets of remote upgrading keys installed in the step 201.

Suppose that the set of remote upgrading keys may have a key identification of 00 and a key value of 00 01 02 03 04 05 06 07, then the set of remote upgrading keys are: 00 00 01 02 03 04 05 06 07.

In addition, in the embodiment of the present invention, all the data is represented in the hexadecimal form unless otherwise particularly described.

The term "enabling" described in this step means that the set of remote upgrading keys are made be effective keys (i.e., are used to decrypt and/or perform signature verification on the upgrading information).

Step 203: when one of the remote upgrading keys installed in the step 201 is divulged, connecting the key disabling operation identification and the divulged remote upgrading key (comprising the key identification and the key value) to form the key disabling data by the remote source apparatus.

Then the key disabling data may be represented as 01 00 00 01 02 03 04 05 06 07.

In addition, in practical applications, check of "whether a remote upgrading key is divulged" is not accomplished by the information security apparatus or the remote source apparatus, but divulgences or attacks caused by the divulgences are found by persons or other security monitoring apparatuses. Check of "whether a remote upgrading key is divulged" is within the scope of the prior art but is not within the discussion scope of the present invention, and thus will not be further described herein.

Step 204: sending the key disabling data to the information security apparatus by the remote source apparatus.

Step 205: receiving the key disabling data by the information security apparatus.

Step 206: checking 1 byte in the received key disabling data by the information security apparatus, wherein if the byte is 01, then it represents that the command of executing the key disabling operation is received and then the second byte will be checked; otherwise, the process flow is ended. During the check of the second byte, if the second byte is 00, which shows that the second byte is the same as the identification of the remote upgrading key installed in the information security apparatus, then it represents that the command of executing the disabling operation of the key having the key identification of 00 is received; otherwise, the process flow is ended. Next, the third to the tenth bytes are checked. If the bytes are the same as the key value corresponding to the key having the key identification of 00 in the information security apparatus (i.e., are 00 01 02 03 04 05 06 07), then the check passes and the disabling operation is performed on the remote upgrading key of 00 00 01 02 03 04 05 06 07; otherwise, if the check does not pass, then the process flow is ended.

Up to this point, the process flow of this embodiment is ended.

In addition, the aforesaid key value of the divulged remote upgrading key is an embodiment of the corresponding value of the divulged remote upgrading key, and the corresponding value may also be in some other form.

The key disabling data may further comprise: a key disabling operation identification, a key identification of the divulged remote upgrading key, and a corresponding value of the divulged remote upgrading key; and a corresponding value of the remote upgrading key may further be set in the information security apparatus. If the key disabling operation identification in the received key disabling data is the same as the key disabling operation identification set in the information security apparatus after the key disabling data is received by the information security apparatus, then the check continues; otherwise, the process flow is ended. The check continues as follows: if the key identification of the divulged remote upgrading key in the received key disabling data is the same as a key identification of a set of remote upgrading keys that has been enabled in the information security apparatus and the corresponding value in the received key disabling data is the same as a corresponding value of the set of remote upgrading keys in the information security apparatus, then the disabling operation is performed on the set of remote upgrading keys; otherwise, the process flow is ended.

In a word, the way of performing legality verification on the key disabling data according to the present invention is not limited, and what described above is only exemplary.

Embodiment II

Figure 3:
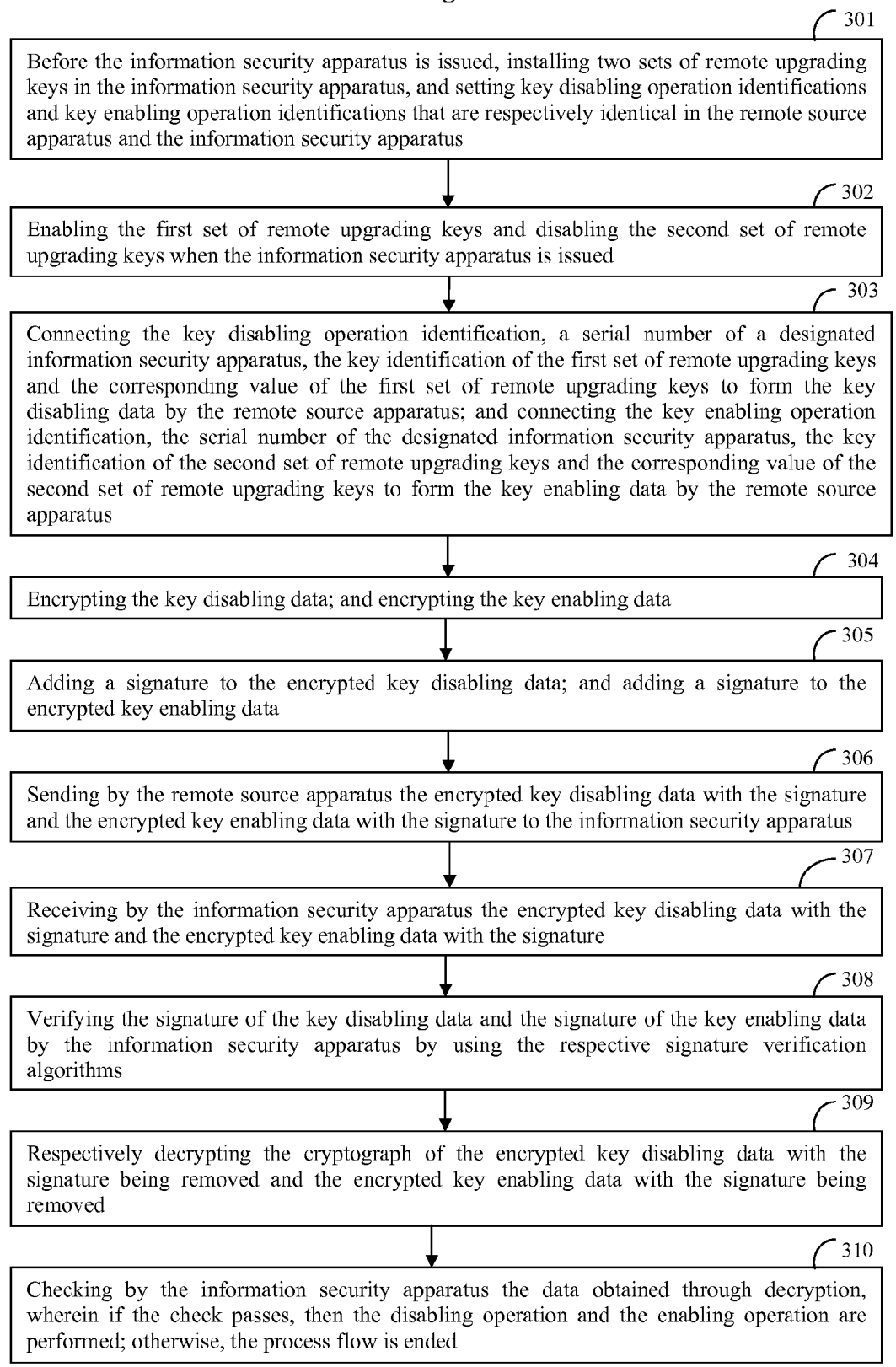
FIG. 3 is a flowchart diagram of an embodiment II of a method for managing remote upgrading keys in an information security apparatus according to the present invention.

FIG. 3 is a flowchart diagram of an embodiment II of a method for managing remote upgrading keys in an information security apparatus according to the present invention. As shown in FIG. 3, the method comprises the following steps.

Step 301: before the information security apparatus is issued, installing two sets of remote upgrading keys in the information security apparatus, and setting key disabling operation identifications and key enabling operation identifications that are respectively identical in the remote source apparatus and the information security apparatus.

As shown in Table 1, the first row of Table 1 shows the first set of remote upgrading keys which comprises a key identification and a key value, and the second row of Table 1 shows the second set of remote upgrading keys which also comprises a key identification and a key value.

The key disabling operation identification is used to represent that the operation type is the key disabling operation. The key enabling operation identification is used to represent that the operation type is the key enabling operation. The meanings of the terms "enabling" and "disabling" have been described in connection with the embodiment I.

In this embodiment, the key disabling operation identification may be 01, and the key enabling operation identification may be 02.

| Key identification | Key value |
| --- | --- |
| 00 | 01 02 03 04 05 06 07 08 |
| 01 | 09 0A 0B 0C 0D 0E 0F 10 |

Step 302: enabling the first set of remote upgrading keys (i.e., the remote upgrading keys having the key identification of 00) when the information security apparatus is issued, with the second set of remote upgrading keys (i.e., the remote upgrading keys having the key identification of 01) being keys that have not been enabled (i.e., disabled keys).

Step 303: when the first set of remote upgrading keys installed in the step 301 are divulged, connecting the key disabling operation identification, a serial number of a designated information security apparatus, the key identification of the first set of remote upgrading keys and the corresponding value of the first set of remote upgrading keys to form the key disabling data by the remote source apparatus; and connecting the key enabling operation identification, the serial number of the designated information security apparatus, the key identification of the second set of remote upgrading keys and the corresponding value of the second set of remote upgrading keys to form the key enabling data by the remote source apparatus.

Suppose that the serial number of the designated information security apparatus is 91 82 00 00 00 01 35 2A.

The corresponding value of the first set of remote upgrading keys is a result obtained through calculation of the key value of the first set of remote upgrading keys according to the message digest algorithm 5 (MD5) (i.e., 0e e0 64 6c 1c 77 d8 13 1c c8 f4 ee 65 c7 67 3b). Likewise, the corresponding value of the second set of remote upgrading keys is a result obtained through calculation of the key value of the second set of remote upgrading keys according to the message digest algorithm 5 (MD5) (i.e., 55 8b e1 82 b7 fd de 05 65 59 7c e7 b3 43 c8 95).

Then the key disabling data may be represented as 01 91 82 00 00 00 01 35 2A 00 0e e0 64 6c 1c 77 d8 13 1c c8 f4 ee 65 c7 67 3b.

The key enabling data may be represented as 02 91 82 00 00 00 01 35 2A 01 55 8b e1 82b7 fd de 05 65 59 7c e7b3 43 c8 95.

Step 304: encrypting the key disabling data, with the encrypted key disabling data being 53 61 6c 74 65 64 5f 5f13 d0 72 78 e1 cc 1a c3 64 24 75 ea c9 69 15 c2 d4 3e a5 c6 f9 47 d3 68 f1 00 cb e2 c1 32 8a 35 7f 5f c2 f4 07 a0 dd 56; and encrypting the key enabling data, with the encrypted key enabling data being 53 61 6c 74 65 64 5f 5f e7 97 99 ec 54 0a 3e 97 ff db 3d 91 16 d1 74 a7 85 ce d4 b8 96 4e 4d 65 ec ca 88 f5 09 2b 8f e3 47 51 d6 00 f4 77 29 c1.

In this step, the encryption may be executed in the following way: storing a 3DES key in the information security apparatus and the remote source apparatus in advance (e.g., the 3DES key has a key value of C1 18 9E F2 6D 07 27 FB AC 85 88 46 B7 7B 55 4D), and executing the encryption by means of the 3DES algorithm and by using the aforesaid key value.

Step 305: adding a signature to the encrypted key disabling data, with the signature obtained being 91 77 0f 00 a4 8c c2 91 72 3d 54 07 9e ae d9 6b 32 9e c1 eb 97 c7 87 bb 3c f3 69 ae 84 4c 28 7e 08 75 e2 61 08 84 fa 01 fb 65 41 f7 62 4e32 f1 dc 28 5b a3 a9 be 27 17 d6 a1 06 e0 02 d6 cd d9; and adding a signature to the encrypted key enabling data, with the signature obtained being 95 78 77 ff 5f ff 69 39 9b 40 4c 13 96 94 01 e3 0d da bf ab 07 2a e4 b4 08 3c c9 53 78 64 40 68 ee c7 2e 4c c9 92 b2 76 0a ec c2e9 13 15 40 6d f0 d4 0c fb ce ae 09 19 28 5a c4 1f e50e 56 0e.

In this step, the signature may be added in the following way: storing an RSA key in the information security apparatus and the remote source apparatus in advance (e.g., a key value of the RSA key that has experienced BASE64 encoding is MIIBOgIBAAJBAMIAG4Mopb961HpiErYaFzA8jCyLHA
vybBoY9Gz1MDFHv6
kx7WcOWa6l2Ka0ZCoQAH6ukFZcVso0aNdLgKgv+
b0CAwEAAQJABOw5xn8+
jXhRcfWRIfvRgNDYgbzZ7letdJATi7xBB88N70t3kXo0ZZ
DDAegoeoNr+wvn4 msmpIkjNV2/
AgPpIQIhAPBp7XnXkAmd48oassbRmLvppinCuv6UjxfIy
AmUGf5 5AiEAzpPfLkvzBIRXcW0xbiMQg8djY5oXGS
SXp8zxUdyuNGUCIQC1yiN8An g0DWP1qwK
MPGkVjrPK2Ci14HfjMDuyon6VYQIgHQ8aDwYqC1Gfh
1on4OlX0mHC7mjnpObL2pPuwmg7rS0CIHoh VP0havN
YsHGnB/smf2JCjhZXrHpgKj7GI dmuC18+), and adding the signature by means of the RSA algorithm and by using the aforesaid key value.

As can be seen from the aforesaid steps 301~305, the steps collectively involve the following security processing process: the first set of upgrading keys and the second set of upgrading keys are encrypted respectively in the step 303, the key disabling data and the key enabling data are encrypted respectively in the step 304, the encrypted key disabling data and the encrypted key enabling data are signed respectively in the step 305, and then the encryption key, the encryption algorithm, the signature algorithm and/or the signature key for each encryption and/or signature are necessarily pre-set in the remote source apparatus. Correspondingly, before the information security apparatus is issued, the decryption key, the decryption algorithm, the signature verification algorithm and/or the signature verification key for each decryption and/or signature verification are necessarily pre-set in the information security apparatus.

Step 306: sending by the remote source apparatus the encrypted key disabling data with the signature and the encrypted key enabling data with the signature to the information security apparatus.

Step 307: receiving by the information security apparatus the encrypted key disabling data with the signature and the encrypted key enabling data with the signature: 53 61 6c 74 65 64 5f 5f 13 d0 72 78 e1 cc 1a c3 64 24 75 ea c9 69 15 c2 d4 3e a5 c6 f9 47 d3 68 f1 00 cb e2 c1 32 8a 35 7f 5f c2 f4 07 a0 dd 56 91 77 0f 00 a4 8c c2 91 72 3d 54 07 9e ae d9 6b 32 9e c1 eb 97 c7 87 bb 3c f3 69 ae 84 4c 28 7e08 75 e2 61 08 84 fa 01 fb 65 41 f7 62 4e32 f1 dc 28 5b a3 a9 be 27 17 d6 a1 06 e0 02 d6 cd d9 53 61 6c 74 65 64 5f 5f e7 97 99 ec 54 0a 3e97 ff db 3d 91 16 d1 74 a7 85 ce d4 b8 96 4e 4d 65 ec ca 88 f5 09 2b 8f e3 47 51 d6 00 f4 77 29 c1 95 78 77 ff 5f ff 69 39 9b 40

4c 13 96 94 01 e3 0d da bf ab 07 2a e4 b4 08 3c c9 53 78 64 40 68 ee c7 2e 4c c9 92 b2 76 0a ec c2e9 13 15 40 6d f0d4 0c fb ce ae 09 19 28 5a c4 1f e50e 56 0e.

Step 308: verifying the signature of the key disabling data and the signature of the key enabling data by the information security apparatus by using the respective signature verification algorithms.

Specifically, a signature value of the key disabling data and a signature value of the key enabling data are calculated. If the signature values are the same as the two received signatures respectively, then step 309 is executed; otherwise, the process flow is ended.

Step 309: respectively decrypting the cryptograph of the encrypted key disabling data with the signature being removed and the encrypted key enabling data with the signature being removed to obtain 01 91 82 00 00 00 01 35 2A 00 0e e0 64 6c 1c 77 d8 13 1c c8 f4 ee 65 c7 67 3b 02 91 82 00 00 00 01 35 2A 01 55 8b e1 82b7 fd de 05 65 59 7c e7b3 43 c8 95.

Step 310: checking by the information security apparatus the data obtained through decryption in the step 309. Firstly, the first byte is checked. If the first byte is 01, then it represents that the command of executing the key disabling operation is received; otherwise, the process flow is ended. Then, the second to the ninth bytes are checked. If the bytes are different from their own serial numbers, then the process flow is ended; otherwise, if the bytes are the same as their own serial numbers, then the tenth byte continues to be checked. If the tenth byte is 00, which shows that the tenth byte is the same as the identification of the first set of remote upgrading keys installed in the information security apparatus, then it represents that the command of executing the disabling operation of the key having the key identification of 00 is received. Next, the eleventh to the twenty-sixth bytes are checked. If the bytes are the same as the MD5 value of the key value corresponding to the key having the key identification of 00 in the information security apparatus (i.e., are 0e e0 64 6c 1c 77 d8 13 1c c8 f4 ee 65 c7 67 3b), then the check passes and the disabling operation is performed on the first set of remote upgrading keys; otherwise, if the check does not pass, then the process flow is ended. The twenty-seventh byte is checked. If the twenty-seventh byte is 02, then it represents that the command of executing the key enabling operation is received; otherwise, the process flow is ended. Next, the twenty-eighth to the thirty-fifth bytes are checked. If the bytes are different from their own serial numbers, then the process flow is ended; otherwise, if the bytes are the same as their own serial numbers, then the thirty-sixth byte continues to be checked. If the thirty-sixth byte is 01, which shows that the thirty-sixth byte is the same as the identification of the second set of remote upgrading keys installed in the information security apparatus, then it represents that the command of executing the enabling operation of the key having the key identification of 01 is received. Next, the thirty-seventh to the fifty-second bytes are checked. If the bytes are the same as the MD5 value of the key value corresponding to the key having the key identification of 01 in the information security apparatus (i.e., are 55 8b e1 82 b7 fd de 05 65 59 7c e7 b3 43 c8 95), then the check passes and the enabling operation is performed on the second set of remote upgrading keys; otherwise, if the check does not pass, then the process flow is ended.

Up to this point, the process flow of this embodiment is ended.

In addition, the aforesaid key value of the remote upgrading key to be enabled is an embodiment of the corresponding value of the remote upgrading key to be enabled, and the corresponding value may also be in some other form.

The key enabling data may further comprise: a key enabling operation identification, a key identification of the remote upgrading key to be enabled, and a corresponding value of the remote upgrading key to be enabled; and a corresponding value of the remote upgrading key may further be set in the information security apparatus. If the key enabling operation identification in the received key enabling data is the same as the key enabling operation identification set in the information security apparatus after the key enabling data is received by the information security apparatus, then the check continues; otherwise, the process flow is ended. The check continues as follows: if the key identification of the remote upgrading key to be enabled in the received key enabling data is the same as a key identification of a set of remote upgrading keys that has not been enabled in the information security apparatus and the corresponding value in the received key enabling data is the same as a corresponding value of the set of remote upgrading keys in the information security apparatus, then the enabling operation is performed on the set of remote upgrading keys; otherwise, the process flow is ended.

In a word, the way of performing legality verification on the key enabling data according to the present invention is not limited, and what described above is only exemplary.

In this embodiment, the following points need be appreciated.

First, the fact that disabling of a set of remote upgrading keys and enabling of another set of remote upgrading keys are accomplished through one process flow is illustrated in this embodiment simply by taking simultaneous transmission of the key disabling data and the key enabling data as an example. In practical applications, a set of remote upgrading keys may firstly be disabled and then another set of remote upgrading keys are enabled; or a set of remote upgrading keys may firstly be enabled and then another set of remote upgrading keys are disabled.

Second, in this embodiment, both the encryption and the signature are within the scope of security processing, and may be accomplished in common security processing ways. For example, the encryption is performed by means of the data encryption standard (DES) algorithm, the triple data encryption standard (TDES) algorithm, the advanced encryption standard (AES) algorithm, the asymmetrical encryption RSA algorithm or the elliptic curve cryptography (ECC) algorithm, and the signature is added by means of the message authentication code (MAC) algorithm, the hash message authentication code (HMAC) algorithm, the RSA algorithm or the ECC algorithm.

Correspondingly, decryption and/or signature are performed in common security check ways in the information security apparatus. For example, the decryption is performed by means of the DES algorithm, the TDES algorithm, the AES algorithm, the RSA algorithm or the ECC algorithm, and the signature verification is performed by means of the MAC algorithm, the HMAC algorithm, the RSA algorithm or the ECC algorithm.

As can be seen from the aforesaid process flow of this embodiment, a key cannot be disabled or enabled until the key disabling data or the key enabling data is obtained, and this prevents malicious attackers from illegally disabling or enabling the remote upgrading keys. The communication between the remote source apparatus and the information security apparatus may be insecure, and the malicious attackers may intercept and alter the key disabling data or the key enabling data. The security processing in this embodiment can solve this problem. Specifically, the signature processing can prevent the key disabling data and the key enabling data from being altered and ensure the integrity of the data; and the encryption processing can ensure that the malicious attackers cannot obtain the key to be disabled or enabled even if the key disabling data and the key enabling data are intercepted and thus ensure the security controllability of the disabling and the enabling operations of the remote upgrading keys. As compared to the embodiment I, the embodiment II further improves the reliability of the method.

Moreover, in this embodiment, the key disabling data and the key enabling data are provided with the serial number of the designated information security apparatus so that it can be ensured that the key disabling data and the key enabling data are effective only for the specific information security apparatus.

According to the above descriptions, in the present invention, the remote source apparatus generates key disabling data according to a divulged remote upgrading key and sends the key disabling data to the information security apparatus, and the information security apparatus performs the disabling operation on the divulged remote upgrading key according to the received key disabling data. This can prevent the information security apparatus from being maliciously attacked by the malicious attackers by using the divulged remote upgrading key and through the remote upgrading process.

Meanwhile, the present invention further enables a new remote upgrading key to replace the disabled remote upgrading key, and this makes the remote upgrading function of the information security apparatus continuously available and effectively enhances the security of the remote upgrading keys of the information security apparatus.

What described above are only preferred embodiments of the present invention but are not intended to limit the scope of the present invention. Accordingly, any modifications, equivalent substitutions and improvements that are made within the scope of the spirits and scope of the present invention shall also fall within the scope of the present invention.

The invention claimed is:

1. A method for managing remote upgrading keys in an information security apparatus, comprising: installing M sets of remote upgrading keys in the information security apparatus before the information security apparatus is issued, and enabling N set(s) of the M sets of remote upgrading keys when the information security apparatus is issued, wherein M and N are positive integers larger than or equal to 1 and N is smaller than M, the method further comprising:
   generating key disabling data according to a divulged remote upgrading key and sending the key disabling data to the information security apparatus by a remote source apparatus, wherein the key disabling data is used to direct the information security apparatus to perform a disabling operation on the divulged remote upgrading key;
   performing the disabling operation on the divulged remote upgrading key according to the received key disabling data by the information security apparatus; and
   setting key disabling operation identifications that are identical in the remote source apparatus and the information security apparatus before the information security apparatus is issued;
   wherein the key disabling data comprises: a key disabling operation identification, a key identification of the divulged remote upgrading key, and a corresponding value of the divulged remote upgrading key; and
   the step of performing the disabling operation on the divulged remote upgrading key according to the received key disabling data comprises:
      A1. if the key disabling operation identification in the received key disabling data is the same as the key disabling operation identification set in the information security apparatus, then a step B1 will be executed; otherwise, the process flow is ended; and
      B1. if the key identification of the divulged remote upgrading key in the received key disabling data is the same as a key identification of a set of remote upgrading keys that has been enabled in the information security apparatus and the corresponding value in the received key disabling data is the same as a corresponding value of the set of remote upgrading keys in the information security apparatus, then performing the disabling operation on the set of remote upgrading keys; otherwise, the process flow is ended.

2. The method of claim 1, wherein the corresponding value of the divulged remote upgrading key is a key value of the divulged remote upgrading key.

3. The method of claim 2, further comprising:
   performing security processing on the key disabling data and then sending the key disabling data to the information security apparatus by the remote source apparatus; and
   performing security check on the key disabling data that has experienced the security processing by the information security apparatus, wherein if the security check passes, then the step A1 is executed; otherwise, the process flow is ended.

4. The method of claim 1, further comprising:
   performing security processing on the key disabling data and then sending the key disabling data to the information security apparatus by the remote source apparatus; and
   performing security check on the key disabling data that has experienced the security processing by the information security apparatus, wherein if the security check passes, then the step A1 is executed; otherwise, the process flow is ended.

5. The method of claim 4, wherein
   the security processing comprises: encrypting and/or adding a signature to the key disabling data; and
   the security check comprises: decrypting and/or performing signature verification on the key disabling data that has experienced the security processing.

6. The method of claim 5, wherein
   the encrypting step comprises: performing encryption by means of the data encryption standard (DES) algorithm, the triple data encryption standard (TDES) algorithm, the advanced encryption standard (AES) algorithm, the asymmetrical encryption RSA algorithm or the elliptic curve cryptography (ECC) algorithm;
   the step of adding a signature comprises: adding a signature by means of the message authentication code (MAC) algorithm, the hash message authentication code (HMAC) algorithm, the RSA algorithm or the ECC algorithm;
   the decrypting step comprises: performing decryption by means of the DES algorithm, the TDES algorithm, the AES algorithm, the RSA algorithm or the ECC algorithm; and
   the step of performing signature verification comprises: performing signature verification by means of the MAC algorithm, the HMAC algorithm, the RSA algorithm or the ECC algorithm.

7. The method of claim 1, further comprising:
   generating key enabling data according to a remote upgrading key to be enabled and sending the key enabling data to the information security apparatus by the remote source apparatus, wherein the key enabling data is used to direct the information security apparatus to perform an enabling operation on the remote upgrading keys that have not been enabled; and performing the enabling operation on the remote upgrading keys that have not been enabled according to the received key enabling data by the information security apparatus.

8. The method of claim 7, further comprising: setting key enabling operation identifications that are identical in the remote source apparatus and the information security apparatus before the information security apparatus is issued;

wherein the key enabling data comprises: a key enabling operation identification, a key identification of the remote upgrading key to be enabled, and a corresponding value of the remote upgrading key to be enabled; and the step of performing the disabling operation on the divulged remote upgrading key according to the received key disabling data comprises:

A2. if the key enabling operation identification in the received key enabling data is the same as the key enabling operation identification set in the information security apparatus, then the step B1 will be executed; otherwise, the process flow is ended; and B2. if the key identification of the remote upgrading key to be enabled in the received key enabling data is the same as a key identification of a set of remote upgrading keys that has not been enabled in the information security apparatus and the corresponding value in the received key enabling data is the same as a corresponding value of the set of remote upgrading keys in the information security apparatus, then performing the enabling operation on the set of remote upgrading keys; otherwise, the process flow is ended.

9. The method of claim 8, wherein the corresponding value of the remote upgrading key to be enabled is a key value of the remote upgrading key to be enabled.

10. The method of claim 9, further comprising:

performing security processing on the key enabling data and then sending the key enabling data to the information security apparatus by the remote source apparatus; and performing security check on the key enabling data that has experienced the security processing by the information security apparatus, wherein if the security check passes, then the step A2 is executed; otherwise, the process flow is ended.

11. The method of claim 8, further comprising:

performing security processing on the key enabling data and then sending the key enabling data to the information security apparatus by the remote source apparatus; and performing security check on the key enabling data that has experienced the security processing by the information security apparatus, wherein if the security check passes, then the step A2 is executed; otherwise, the process flow is ended.

12. The method of claim 11, wherein the security processing comprises: encrypting and/or adding a signature to the key enabling data; and the security check comprises: decrypting and/or performing signature verification on the key enabling data that has experienced the security processing.

13. The method of claim 12, wherein the encrypting step comprises: performing encryption by means of the data encryption standard (DES) algorithm, the triple data encryption standard (TDES) algorithm, the advanced encryption standard (AES) algorithm, the asymmetrical encryption RSA algorithm or the elliptic curve cryptography (ECC) algorithm;

the step of adding a signature comprises: adding a signature by means of the message authentication code (MAC) algorithm, the hash message authentication code (HMAC) algorithm, the RSA algorithm or the ECC algorithm;

the decrypting step comprises: performing decryption by means of the DES algorithm, the TDES algorithm, the AES algorithm, the RSA algorithm or the ECC algorithm; and the step of performing signature verification comprises: performing signature verification by means of the MAC algorithm, the HMAC algorithm, the RSA algorithm or the ECC algorithm.

* * * * *